(12) United States Patent
Utsunomiya

(10) Patent No.: US 6,985,247 B2
(45) Date of Patent: Jan. 10, 2006

(54) PRINT APPARATUS, PRINT CONTROL SYSTEM, PRINT CONTROL METHOD, AND STORAGE MEDIUM

(75) Inventor: Takeshi Utsunomiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 09/877,193

(22) Filed: Jun. 11, 2001

(65) Prior Publication Data

US 2002/0051192 A1    May 2, 2002

(30) Foreign Application Priority Data

Jun. 13, 2000   (JP)   ............................. 2000-177455
May 28, 2001   (JP)   ............................. 2001-159037

(51) Int. Cl.
*G06F 15/00*        (2006.01)

(52) U.S. Cl. .................. 358/1.15; 358/1.12; 358/1.14; 358/1.16; 355/407

(58) Field of Classification Search ............... 358/1.15, 358/1.14, 1.12, 1.16; 347/262; 710/6; 270/58.08; 271/279; 355/407
See application file for complete search history.

(56) References Cited

U.S. PATENT DOCUMENTS

| | | | | |
|---|---|---|---|---|
| 5,644,685 A | * | 7/1997 | Baehr ........................ | 358/1.12 |
| 6,181,436 B1 | * | 1/2001 | Kurachi ..................... | 358/1.15 |
| 6,279,892 B1 | * | 8/2001 | Yoshida et al. .......... | 270/58.02 |
| 6,295,081 B1 | * | 9/2001 | Kashima et al. ............ | 347/262 |
| 6,332,170 B1 | * | 12/2001 | Ban ............................. | 710/6 |
| 6,433,884 B1 | * | 8/2002 | Kawakami ................. | 358/1.15 |
| 6,443,449 B1 | * | 9/2002 | Takagi et al. ............... | 271/279 |
| 6,481,703 B2 | * | 11/2002 | Yoshida et al. .......... | 270/58.08 |
| 6,545,766 B1 | * | 4/2003 | Shima et al. ............... | 358/1.14 |
| 6,614,546 B1 | * | 9/2003 | Kurozasa .................... | 358/1.15 |
| 6,671,065 B1 | * | 12/2003 | Salgado et al. ............ | 358/1.16 |
| 6,822,754 B1 | * | 11/2004 | Shiohara .................... | 358/1.15 |
| 2004/0085525 A1 | * | 5/2004 | Namba et al. .............. | 355/407 |

* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

The present invention aims to prevent an inconvenience that, when one print job stops, other print jobs essentially capable of being output are also inoperable and thus increases working efficiency. Thus, on the basis of a situation of a sheet holding unit to be used in an input print job, the order of printing of the input print jobs is changed irrespective of order of input of the print jobs before a print process is started.

44 Claims, 11 Drawing Sheets

FIG. 11A

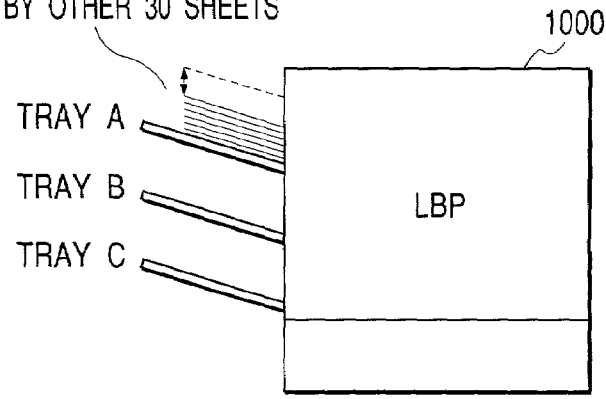

MAX STACKABLE QUANTITY 100 SHEETS
CURRENT STACKING QUANTITY 70 SHEETS
SHEETS REACH MAX BY OTHER 30 SHEETS

FIG. 11B

⟨EXAMPLE 1⟩

| ID | JOB NAME | OUTPUT DESTINATION | THE NUMBER OF SHEETS | OUTPUT NG/OK |
|---|---|---|---|---|
| 1 | JOB 1 | TRAY A | 40 SHEETS | NG |
| 2 | JOB 2 | TRAY A | 20 SHEETS | OK |
| 3 | JOB 3 | TRAY B | 30 SHEETS | OK |
| 4 | JOB 4 | TRAY C | 50 SHEETS | OK |

⟨EXAMPLE 2⟩

| ID | JOB NAME | OUTPUT DESTINATION | THE NUMBER OF SHEETS | OUTPUT NG/OK |
|---|---|---|---|---|
| 1 | JOB 1 | TRAY A | 40 SHEETS | NG |
| 2 | JOB 2 | TRAY A | 50 SHEETS | NG |
| 3 | JOB 3 | TRAY B | 80 SHEETS | OK |
| 4 | JOB 4 | TRAY C | 50 SHEETS | OK |

⟨EXAMPLE 3⟩

| ID | JOB NAME | SHEET SIZE | SHEET TYPE | THE NUMBER OF PRINTS | CONDITION FOR SHEET SIZE | CONDITION FOR SHEET TYPE | CONDITION FOR THE NUMBER OF PRINTS |
|----|----------|------------|------------|----------------------|--------------------------|--------------------------|------------------------------------|
| 1 | JOB 1 | A4 | OHP | 20 SHEETS | OK | NG | NG |
| 2 | JOB 2 | A4 | COMMON SHEET | 80 SHEETS | OK | OK | NG |
| 3 | JOB 3 | A3 | COMMON SHEET | 30 SHEETS | NG | — | — |
| 4 | JOB 4 | A4 | COMMON SHEET | 40 SHEETS | OK | OK | OK |

PRINT APPARATUS, PRINT CONTROL SYSTEM, PRINT CONTROL METHOD, AND STORAGE MEDIUM

BACKGROUND OF THE INVENTION

1. Field of the Invention

The present invention is applicable to a field of print apparatuses. More particularly, the present invention relates to a print control system which includes plural sheet discharge trays and can control order of processing of print jobs, a print control method, and a storage medium.

2. Related Background Art

Conventionally, for example, in a system that print data is transferred from a host computer to a print apparatus having plural sheet discharge trays and print operation is performed by the print apparatus, in a case where order of printing of print jobs based on the transferred print data is controlled, the print job is actually executed according to the order of the corresponding transferred data.

In such a conventional method as above, in a case where one print job is executed in a state that there are the plural print jobs, there is a case that a print process stops when discharged sheets become full on the sheet discharge tray.

As described above, in the case where there are the plural print jobs, such an inconvenient situation as below is caused. Namely, although sheet discharge trays other than the sheet discharge tray used for the first print job are not yet full, when the first job stops because the sheet discharge tray used for the first print job becomes full, the other print jobs to be output to the sheet discharge trays other than the tray used for the first print job are also inoperable. As a result, working efficiency in the above system deteriorates.

SUMMARY OF THE INVENTION

An object of the present invention is to provide a print apparatus, a print control system and a print control method which solved the above problem, and a storage medium which stores a program to perform the above print control method.

Another object of the present invention is to provide a print apparatus which prevents an inconvenient situation that, when one print job stops, other print jobs essentially capable of being output are also inoperable and thus increases working efficiency, print control system and method which can bring the same effect, and a storage medium which stores a program to perform the above print control method.

Other objects and features of the present invention will be apparent from the following description and the attached drawings.

BRIEF DESCRIPTION OF THE DRAWINGS

FIGS. 11A and 11B are diagrams for concretely explaining the main process; and

DETAILED DESCRIPTION OF THE PREFERRED EMBODIMENTS

Hereinafter, the embodiment of the present invention will be explained in detail with reference to the attached drawings.

[System Structure]

First, the system structure will be explained with reference to FIGS. 6 to 10.

In the embodiment, by way of example, a laser beam printer (hereinafter called an LBP) which acts as a print apparatus will be explained as an output apparatus which constitutes a system according to the present invention.

Figure 9:
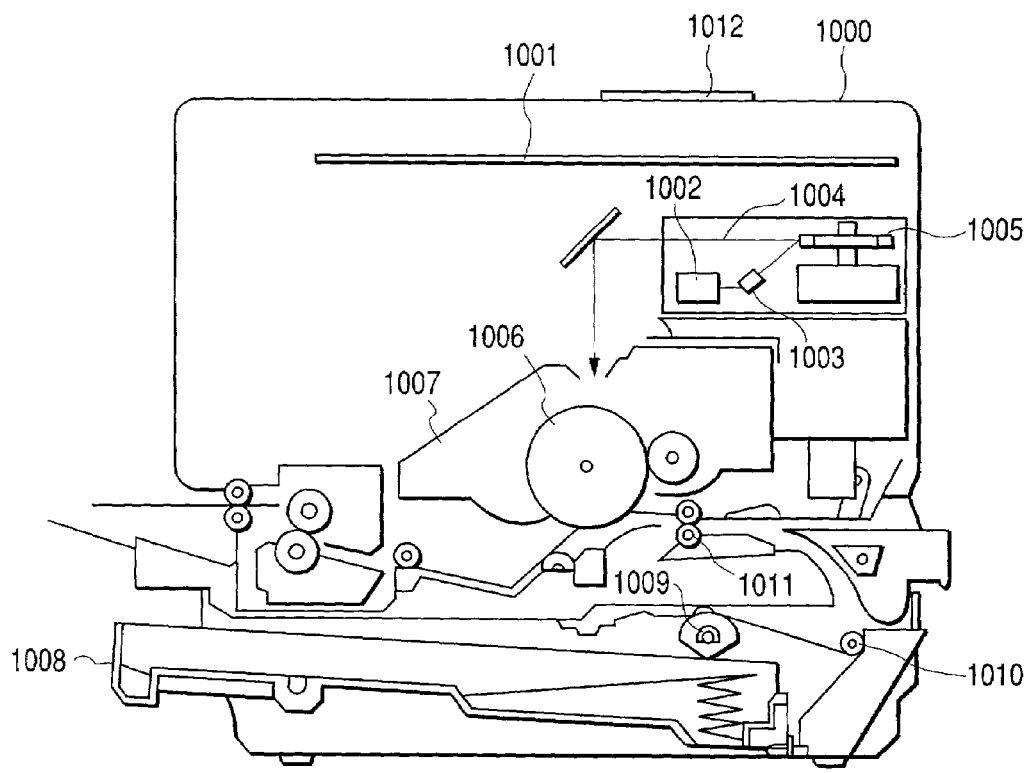
FIG. 9 is a sectional diagram showing an example that an output apparatus according to the embodiment of the present invention is applied to a print apparatus.

FIG. 9 is a sectional diagram showing a structural example of the LBP.

Figure 10:
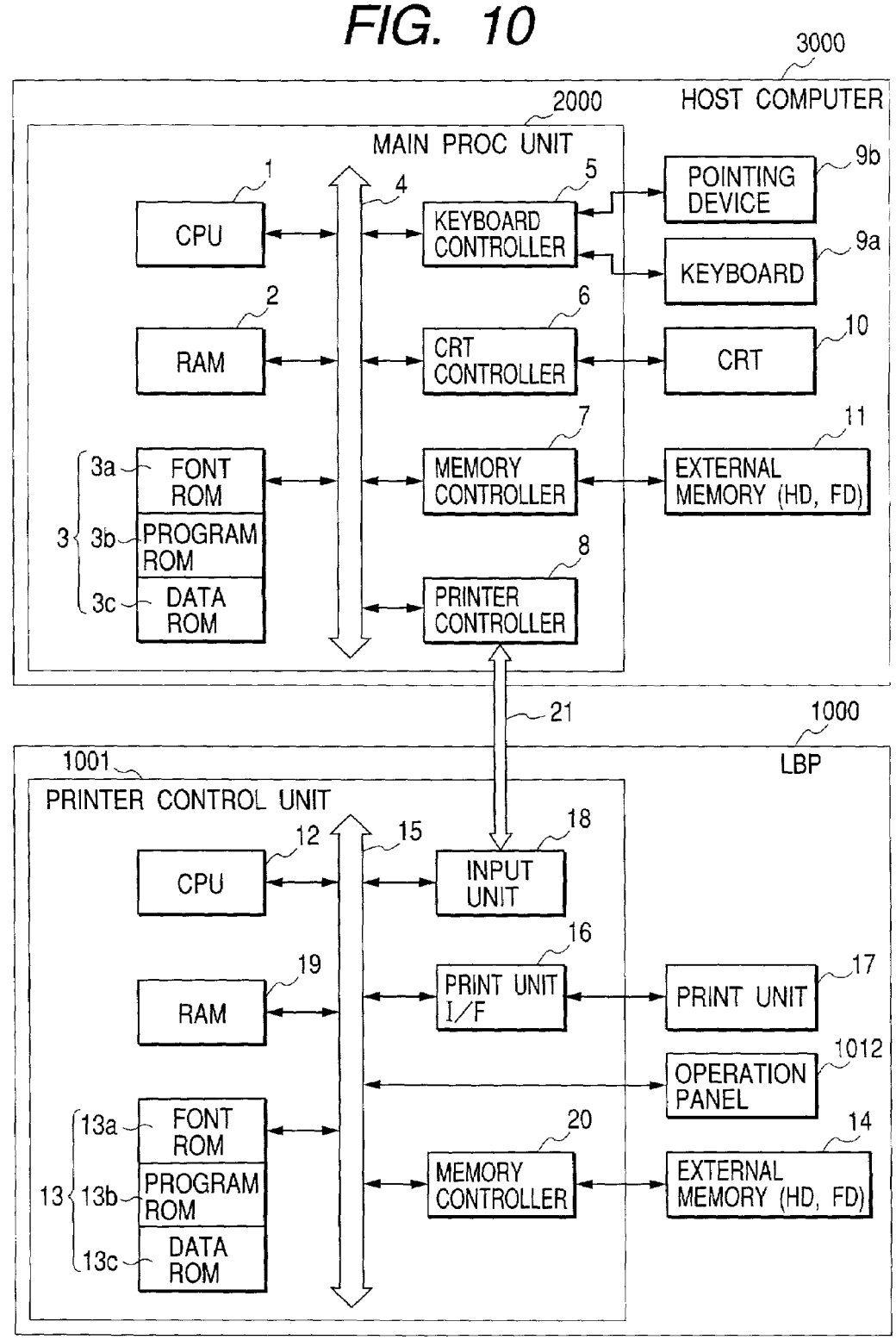
FIG. 10 is a block diagram showing an example of a printer system to which the present invention is applied.

In FIG. 9, numeral 1000 denotes a main body of the LBP (hereinafter simply called the LBP) which inputs and stores print information (a character code, etc.), form information, a macroinstruction and the like which are supplied from an externally connected host computer 3000 (FIG. 10). Further, the LBP 1000 creates a character pattern, a form pattern and the like corresponding to the stored information, and forms images such as these patterns on a recording sheet or the like being a recording medium.

Numeral 1012 denotes an operation panel on which operation switches, LED displays and the like are arranged. Numeral 1001 denotes a printer control unit which controls the LBP 1000 as a whole, and analyzes the character information and the like supplied from the host computer 3000.

The printer control unit 1001 mainly converts the character information into a video signal of the corresponding character pattern, and outputs the obtained video signal to a laser driver 1002.

The laser driver 1002 is the circuit which drives a semiconductor laser 1003. Further, the laser driver 1002 turns on and off a laser beam 1004 from the semiconductor laser 1003, in accordance with the input video signal.

The laser beam 1004 is swung in right and left directions by a rotative polyhedral mirror 1005 to scan and expose a surface of an electrostatic drum 1006. Thus, an electrostatic latent image corresponding to a character pattern is formed on the electrostatic drum 1006.

The formed electrostatic latent image is developed by a development unit 1007 disposed nearby the electrostatic drum 1006, and then transferred to a recording sheet. Cut sheets are used as the recording sheets, and these cut sheets are held in a sheet cassette 1008 mounted to the LBP 1000. Each recording sheet (i.e., each cut sheet) is transported into the LBP 1000 through a sheet feed roller 1009, and transportation rollers 1010 and 1011, and then fed to the electrostatic drum 1006.

Further, the LBP 1000 has at least one card slot (not shown) to which an optional font card storing optional fonts other than internal fonts and a control card (or an emulation card) of different language system can be connected.

FIG. 10 is a block diagram showing an example of a printer control system.

Here, this example will be explained on the basis of the LBP (FIG. 9). It is needless to say that, if it is possible to achieve the functions of the present invention, the present invention is applicable to a single apparatus, a system in which plural apparatuses are included, and a system by which a process is performed through a network such as a LAN (local area network) or the like.

(Host Computer)

Numeral 3000 denotes the host computer. In the host computer 3000, a CPU 1 is provided to perform a text process to a text (or a document) which mixedly includes figures, images, characters, tables (including spreadsheets) and the like, on the basis of a text processing program stored in a program ROM 3b of a ROM 3. Further, the CPU 1 entirely controls various devices and apparatuses connected to a system bus 4.

The program ROM 3b of the ROM 3 further stores a control program of the CPU 1, and the like. A font ROM 3a of the ROM 3 stores font data and the like used in the above text process, and a data ROM 3c of the ROM 3 stores various data used in the above text process and the like.

Numeral 2 denotes a RAM (random-access memory) which functions as a main memory, a working area and the like for the CPU 1. Numeral 5 denotes a keyboard controller which controls key inputting from a keyboard 9a and a pointing device 9b.

Numeral 6 denotes a CRT (cathode ray tube) controller which controls displaying of a CRT display (CRT) 10. Numeral 7 denotes a memory controller (MC) which controls accessing to an external memory 11 such as a hard disk (HD), a floppy disk (FD) or the like storing a boot program, various applications, font data, a user file, an editing file and the like.

Numeral 8 denotes a printer controller which is connected to the LBP 1000 through a predetermined two-way interface 21 and thus controls a communication control process to the LBP 1000.

It should be noted that the CPU 1 performs an expansion (rasterizing) process of outline font to, e.g., a display information RAM set on the RAM 2, whereby a WYSIWYG (what you see is what you get) function can be achieved on the CRT 10. For example, the WYSIWYG function is to create a figure by the application on the CRT 10 located on the side of the host computer 3000, and then print the created figure on the side of the LBP 1000.

Further, the CPU 1 opens various windows which have been registered based on commands indicated by a not-shown mouse cursor or the like displayed on the CRT 10 and thus performs various data processes.

(Printer (LBP))

In the LBP 1000, a CPU 12 entirely controls accessing to various devices and apparatuses connected to a system bus 15, on the basis of a control program stored in a program ROM 13b of a ROM 13, a control program stored in an external memory 14, or the like. Thus, an image signal is output as output information to a print unit (printer) 17 connected through a print unit I/F (interface) 16.

Figure 1:
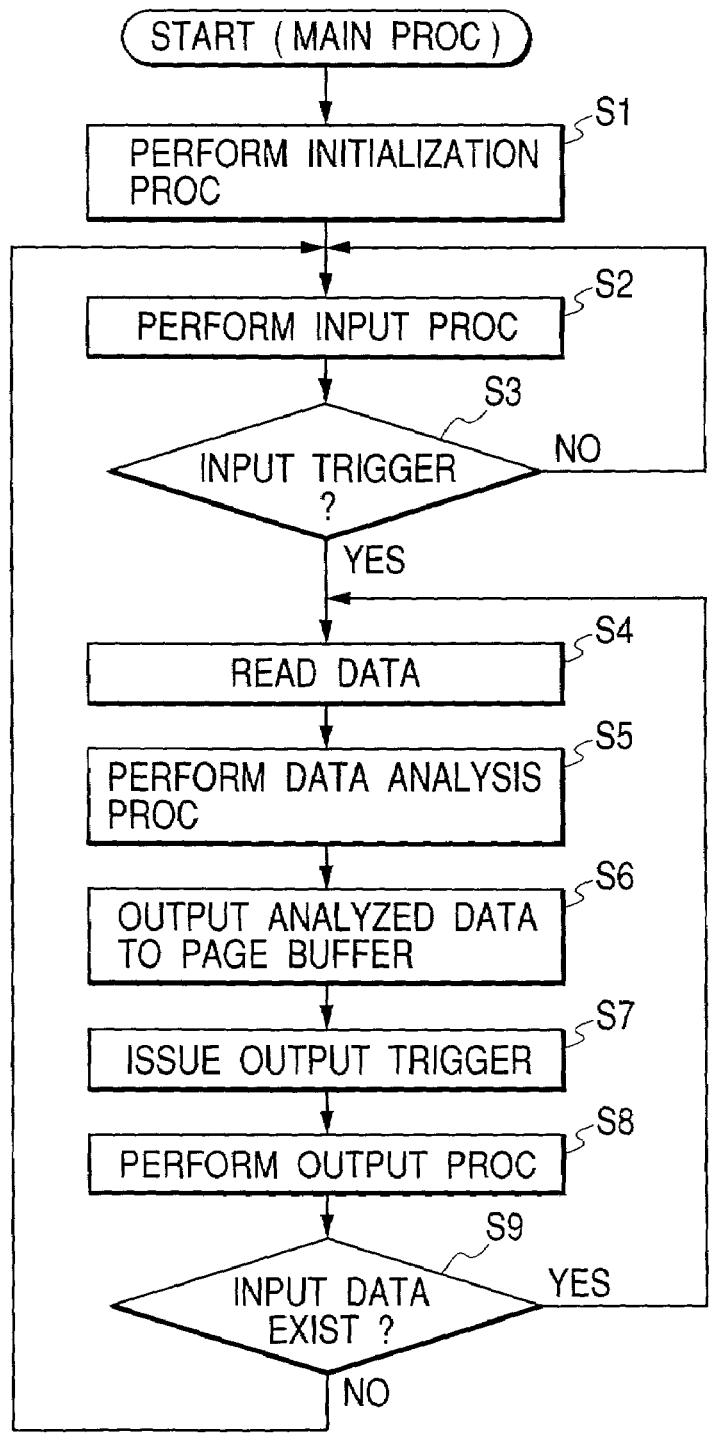
FIG. 1 is a flow chart showing a main process of a printer according to the embodiment of the present invention.
Figure 4:
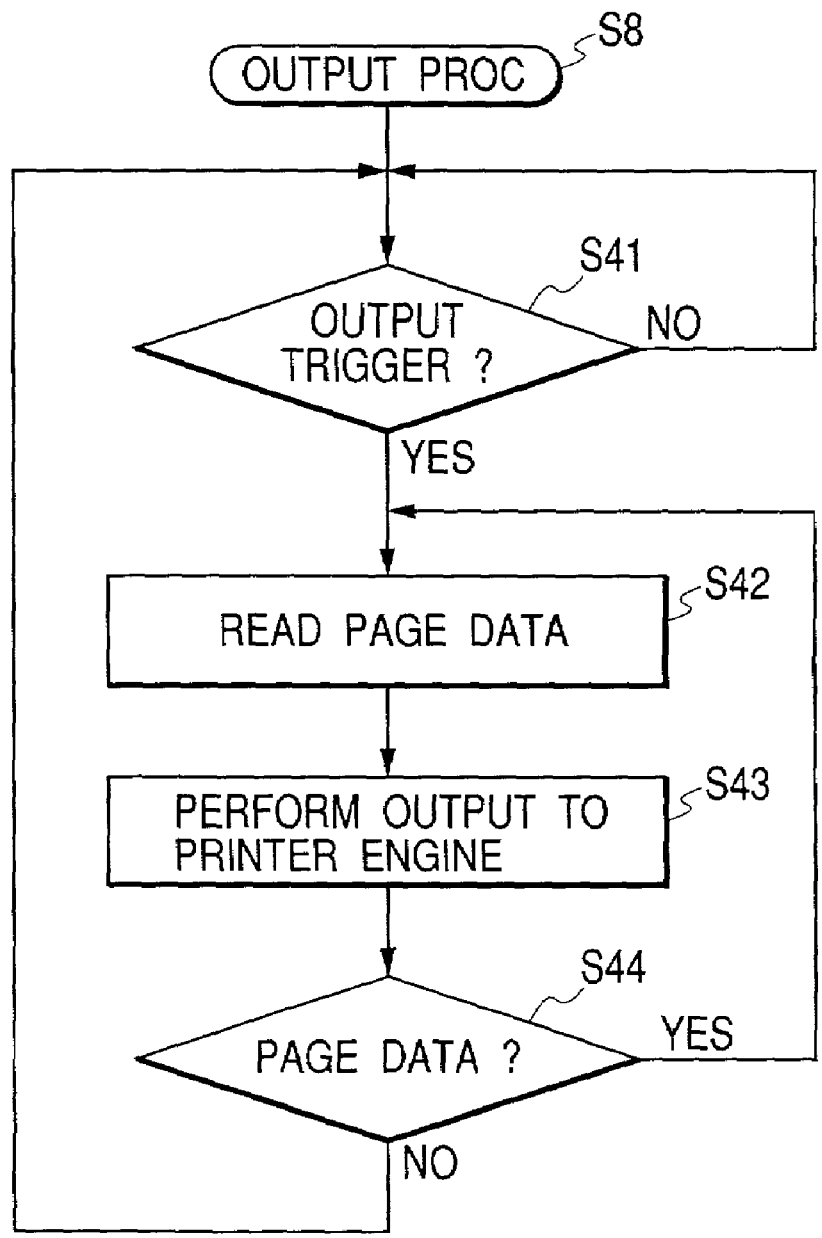
FIG. 4 is a flow chart showing an output process of the printer, shown in FIG. 1.

A control program and the like of the CPU 12 as shown in later-described flow charts of FIGS. 1 and 4 are stored in the program ROM 13b of the ROM 13.

Font data which is used to generate the output information is stored in a font ROM 13a of the ROM 13. If the external memory 14 such as a hard disk or the like is not connected to a printer, information which is used in the host computer 3000 is stored in a data ROM 13c of the ROM 13.

The CPU 12 can perform a call process with the host computer 3000 through an input unit 18, and thus can notify the host computer 3000 of the information or the like in the LBP 1000. In the present embodiment, it is assumed that there are the plural input units 18 each of which can perform the communication.

Numeral 19 denotes a RAM which functions as a main memory, a working area and the like of the CPU 12. It is structured to be able to expand a memory capacity of the RAM 19 by means of an optional RAM connected to a not-shown expansion port.

Incidentally, the RAM 19 is used as an output information expansion area, an environment data storage area, an NVRAM (nonvolatile RAM) or the like. Accessing to the external memory 14 such as the hard disk (HD), an IC card or the like is controlled by an MC (memory controller) 20.

The external memory 14 which is optionally connected stores font data, an emulation program, form data and the like. Numeral 1012 denotes the above-described operation panel on which the operation switches, the LED displays and the like are arranged.

It should be noted that the number of external memories is not limited to "one", and it is structured that the LBP 1000 can include an optional font card storing optional fonts other than internal fonts, and the plural external cards storing programs to interpret a printer control language of different language system. Further, the LBP 1000 may have an NVRAM (not shown) to store printer mode setting information sent from the operation panel 1012.

(Main Processing Unit of Printer (LBP))

Figure 6:
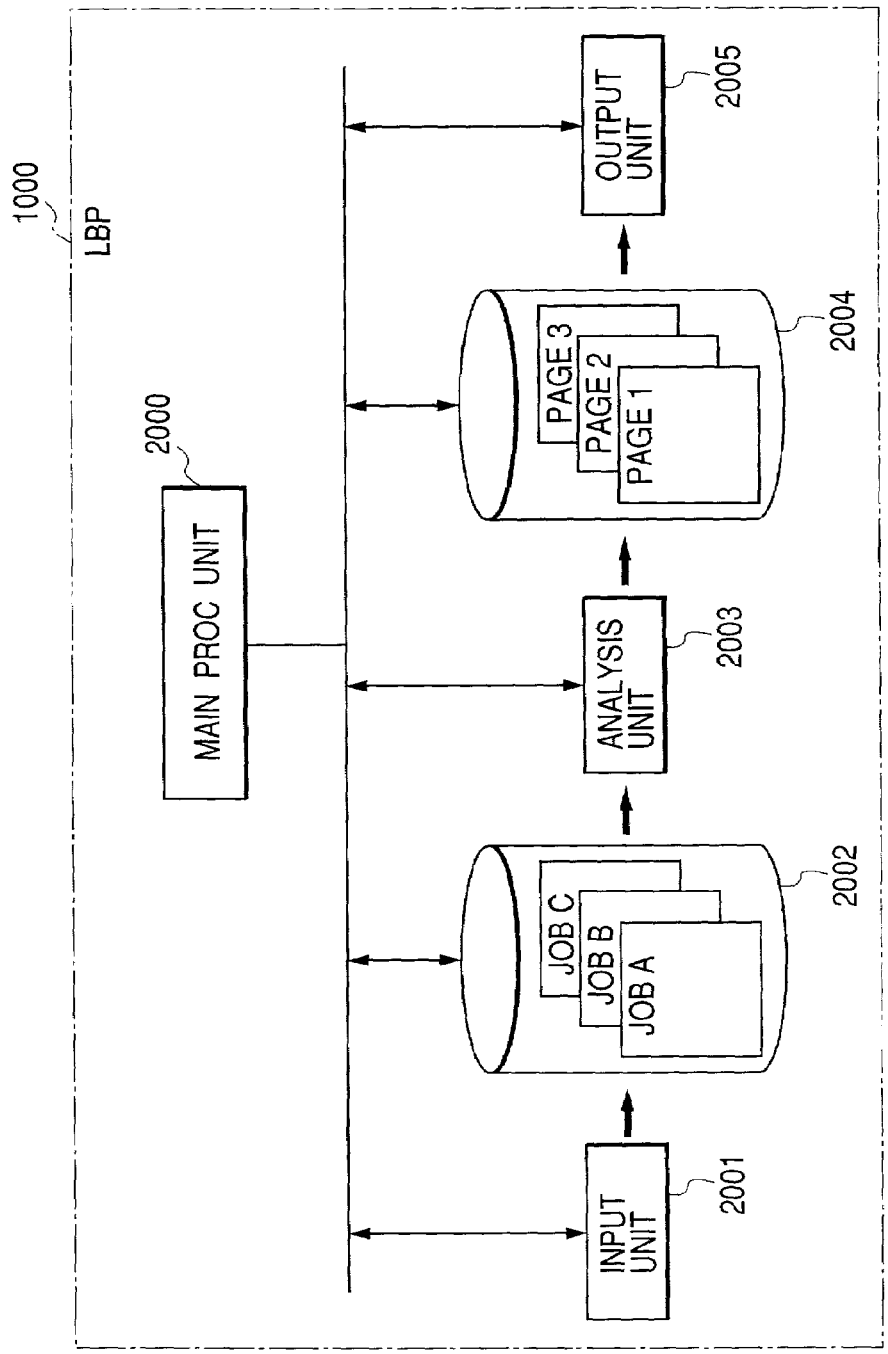
FIG. 6 is a block diagram showing a processing flow in a main processing unit of the printer.

FIG. 6 shows a software structure of the LBP 1000.

A main processing unit 2000 is composed of an input unit 2001 to which print jobs are input, a reception buffer 2002, an analysis unit 2003, a page buffer 2004 and an output unit 2005. The input unit 2001, the analysis unit 2003 and the output unit 2005 are independently operated in different tasks.

The print job input from the input unit 2001 is stored in the reception buffer 2002. When the print jobs (e.g., jobs A, B and C) are stored in the reception buffer 2002, the analysis unit 2003 starts the operation.

The analysis unit 2003 reads and analyzes the print job stored in the reception buffer 2002, and creates a drawing object according to a command of each job. Here, the drawing object is an intermediate code of a form by which a drawing process can be easily performed in the output. The gathering of the plural drawing objects constitutes one page.

The page buffer 2004 stores the drawing object as page data, correspondence information of the page and the drawing object, and the like. When the drawing objects corresponding to one ore more pages are stored in the page buffer 2004, the output unit 2005 starts the operation.

The output unit 2005 reads the data of the page buffer 2004, and actually performs printing on the sheet.

(Print Job)

Figure 7:
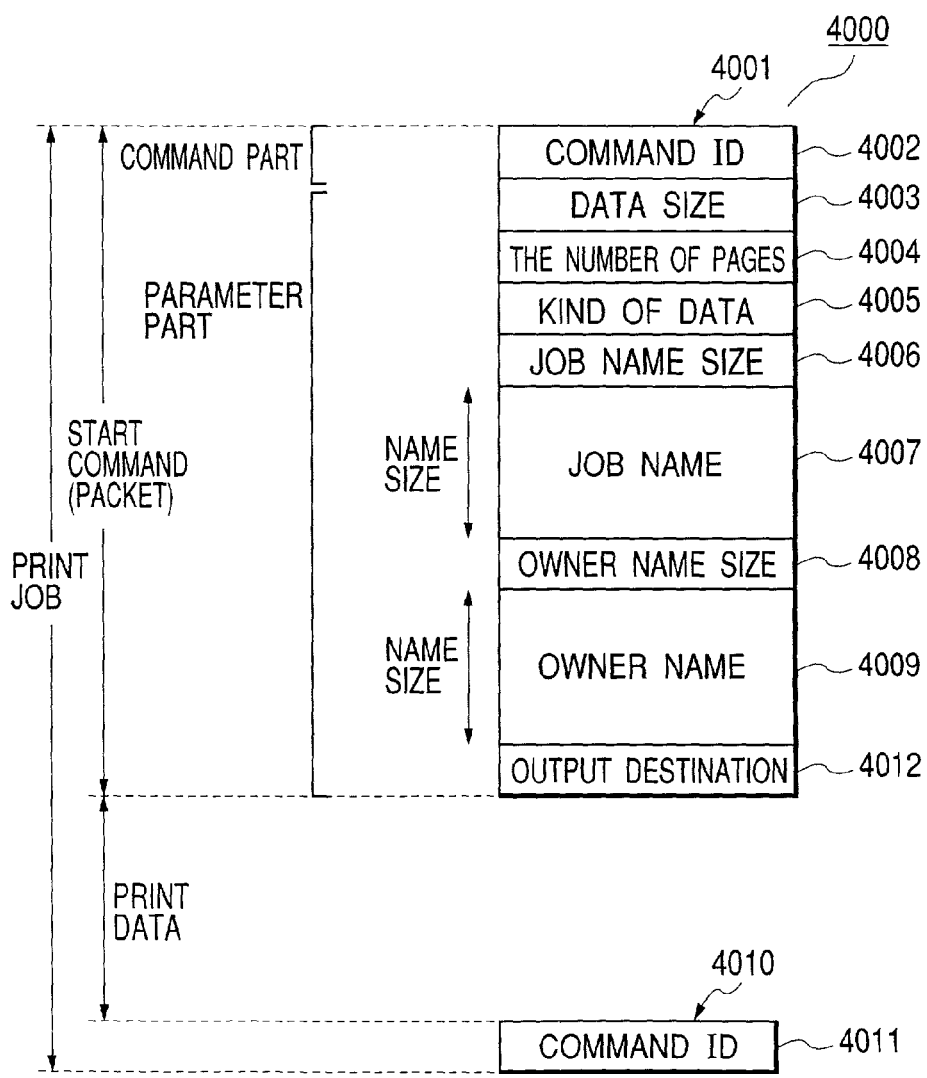
FIG. 7 is a diagram for explaining a command structure (a start command and an end command) of a print job.

FIG. 7 shows a data structure of a print job 4000 transferred from the host computer 3000.

The print job 4000 is composed of a job start command 4001 of the LBP 1000, the print data and a job end command 4010.

The print job 4000 starts at the job start command 4001 and ends at the job end command 4010.

The job start command 4001 is composed of a command ID 4002 which represents that the command is the job start command, a print data size 4003, the number of pages 4004 of the print data, a kind (or a type) of data 4005, a job name size 4006, a job name 4007, an owner name size 4008, an owner name 4009, and a sheet output destination 4012.

The kind of data 4005 includes a character, a document (text), an image and a figure, and a parameter of each data is set by a printer driver program.

Figure 8:
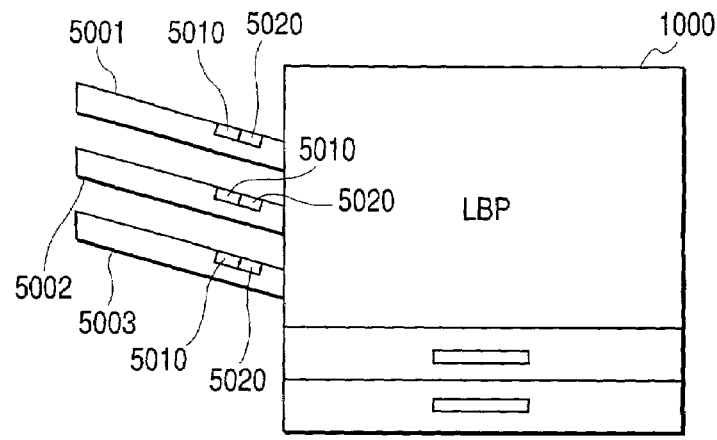
FIG. 8 is a side diagram showing an appearance of a printer having plural sheet discharge trays.

In the sheet output destination 4012, data for designating sheet discharge trays A 5001, B 5002 and C 5003 of FIG. 8 is set. Thus, a user can designate the sheet discharge destination through a setting screen of the host computer. Even if the user does not designate the sheet discharge destination, when the host computer, the LBP or the like automatically determines the destination, the determined information is set in the sheet output destination 4012.

Figures 12A, 12B:
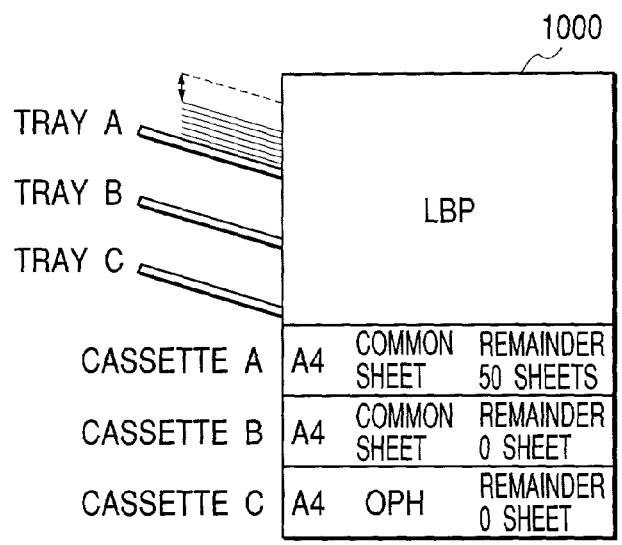
FIGS. 12A and 12B are diagrams for concretely explaining the main process.

As shown in FIG. 12A, if the LBP 1000 has plural sheet feed units, a command concerning sheet feed origin information used to designate a desired one of plural sheet feed trays can be set in the job start command 4001. Thus, the user can designate the sheet feed tray through the setting screen of the host computer, and cause the sheet to be fed from the designated sheet feed tray and subjected to the printing.

Further, sheet size data to designate the size of the sheet to which image formation is performed and sheet type data to designate a type (i.e., a media type) of the sheet to which the image formation is performed can be included in the job start command 4001. Thus, the user can designate the sheet size and the sheet type (i.e., a common sheet, an OHP (overhead projector) sheet or a thick sheet) through the setting screen of the host computer.

On the other hand, the LBP 1000 can set the size and the type of the sheet to be held for each sheet feed unit. Such the size and the type are stored as management information in a memory, whereby the main processing unit 2000 can appropriately read the management information from the memory. Each sheet feed unit has a sensor to detect presence/absence of the sheet and a sensor to detect a quantity of the remainder, and the main processing unit 2000 can capture information from these sensors. Thus, the main processing unit 2000 can confirm the sheet of what size and what type existing, and can confirm how the sheets remain, for each sheet feed unit.

Then, the main processing unit 2000 processes the print job on the basis of the information including the information of the detected results from the sensors of each sheet feed unit, and the sheet size data and the sheet type data included in the job start command 4001.

The job end command 4010 is composed of only a command ID 4011. By the printer driver program on the side of the host computer 3000, the job start command 4001 and the job end command 4010 are added to the print data, and the obtained data is transferred.

FIG. 8 shows an appearance of the LBP 1000.

The LBP 1000 is equipped with the plural trays to which the printed sheets are output. In the present embodiment, there are the three sheet discharge trays, i.e., the sheet discharge tray 5001 (tray A), the sheet discharge tray 5002 (tray B) and the sheet discharge tray 5003 (tray C).

Each of the sheet discharge trays 5001 to 5003 is equipped with a full stack sensor 5010 and a stack quantity sensor 5020. The stack quantity sensor 5020 can detect a quantity of the stacked sheets by 10%.

[System Operation]

Next, the system operation will be explained with reference to FIGS. 1 to 5.

(Main Process)

FIG. 1 is a flow chart of a main process by which the LBP 1000 is entirely controlled. The main process is performed by the above main process unit 2000 of FIG. 6.

First, when a power supply is turned on, the LBP 1000 performs an initialization process in a step S1.

Figure 2:
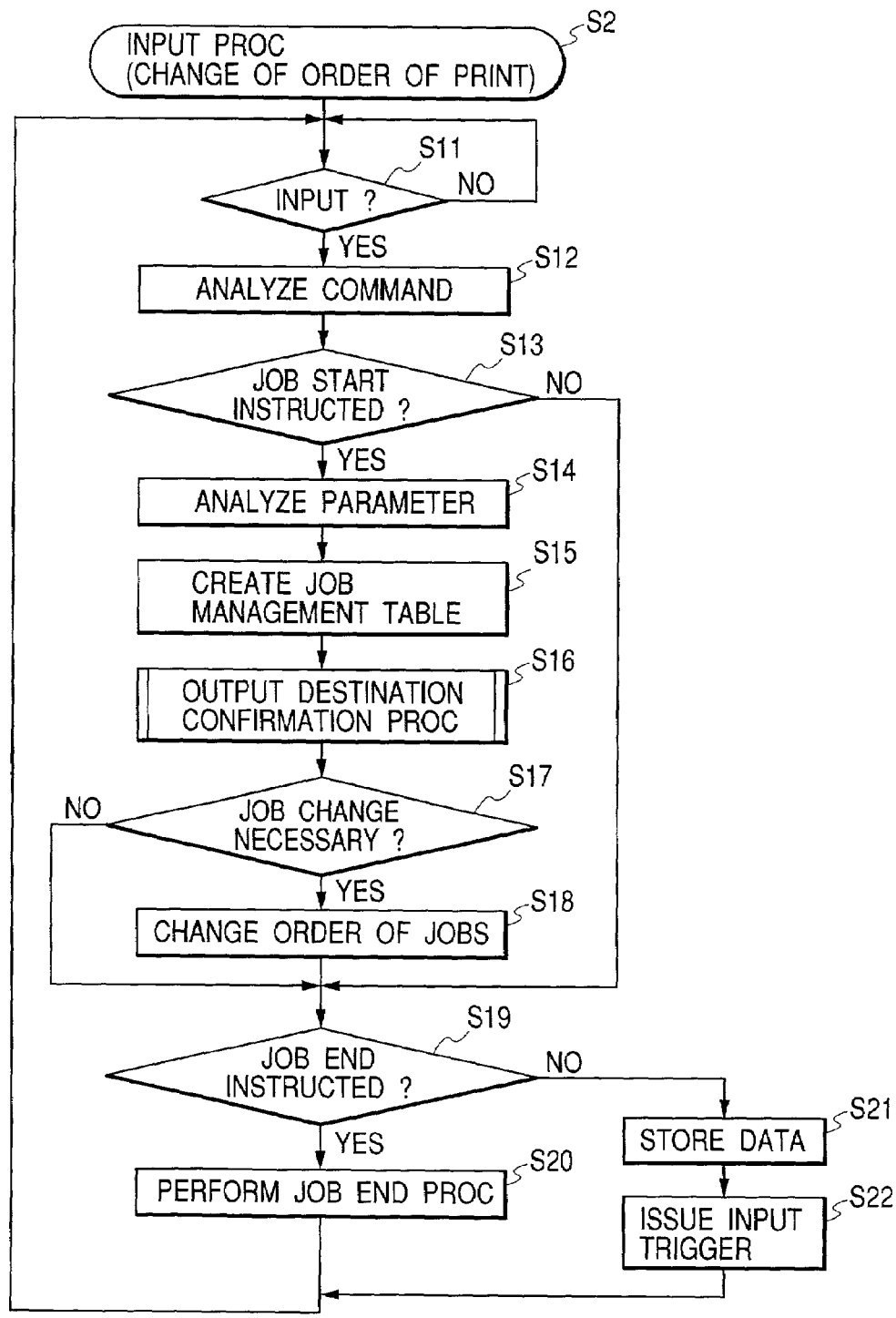
FIG. 2 is a flow chart showing an input process of the printer, shown in FIG. 1.

In a step S2, the input unit 2001 performs an input process as shown in FIG. 2 (later explained in detail).

In a step S3, it waits for an input trigger from the input unit 2001. When the input trigger is input, the flow advances to a step S4.

In the step S4, the print job is transferred from the input unit 2001 to the reception buffer 2002. For example, as shown in FIG. 6, the reception buffer 2002 stores the job A, the job B and the job C.

In a step S5, the print job is transferred from the reception buffer 2002 to the analysis unit 2003, and the analysis unit 2003 analyzes the data.

In a step S6, the analyzed data of the print job is transferred to the page buffer 2004, whereby the data of the first print job intended to be print-processed (the job A in this case) is stored in the unit of page.

In a step S7, the output trigger is issued from the page buffer 2004 to the output unit 2005.

In a step S8, the output unit 2005 performs an output process as shown in FIG. 4 (later explained in detail).

In a step S9, if the data of the print job remains in the reception buffer 2002, the flow returns to the step S3. Conversely, if the data does not remain in the reception buffer 2002, the flow returns to the step S2 to again perform the input process.

(Input Process)

FIG. 2 is a flow chart showing the detail of the input process in the step S2 of FIG. 1.

In a step S11, it waits for the data input, and if the data is input, the flow advances to a step S12.

In the step S12, command analysis is performed. In the command analysis of this step, only the job start command 4001 and the job end command 4010 included in the print job shown in FIG. 7 are detected and analyzed. It should be noted that the analysis process in this step is different from the analysis process in the step S5 of FIG. 1.

In a step S13, it is judged whether or not the job start command 4001 is detected. If the job start command 4001 is detected, the flow advances to a step S14.

In the step S14, the command parameters as shown in FIG. 7 are analyzed.

In a step S15, a job management table 6000 (FIG. 5) is created on the memory in accordance with the analyzed command parameters.

Figure 5:
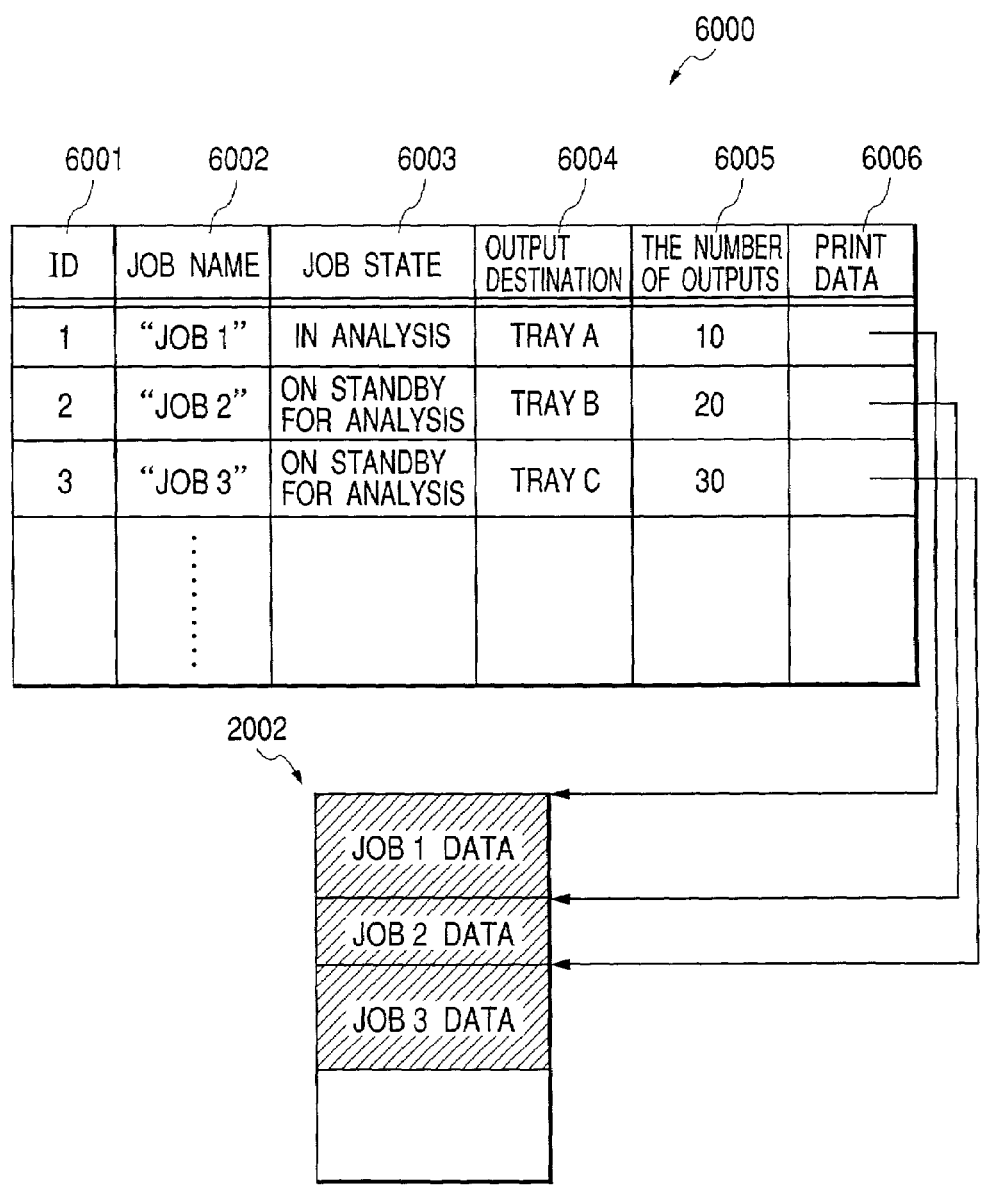
FIG. 5 is a diagram for explaining a job management table of the printer.

FIG. 5 shows the job management table 6000 which is used in the LBP 1000.

The job management table 6000 stores following information for each job.

Namely, the job management table 6000 stores the information of an job ID 6001, a job name 6002, a job state 6003, an output destination 6004, the number of outputs 6005, and print data 6006.

The job ID 6001 represents the number which is used to discriminate the print job in the internal process, and the job ID 6001 is determined on the side of the LBP 1000.

The job name 6002, the output destination 6004, and the number of outputs 6005 are input as parameters of the job start command 4001.

The job state 6003 includes four states, i.e., a state that the job is being stored in the reception buffer 2002 (an analysis waiting state), a state that the job is being subjected to the analysis process (an in-analysis state), a state that the job is being stored in the page buffer 2004 (an output waiting state), and a state that the job is being output.

Here, the flow chart of FIG. 2 will be explained again.

In a step S16, a process (FIG. 3) to confirm the tray of the output destination is performed. This process is called an output destination tray confirmation process hereinafter.

(Output Destination Tray Confirmation Process)

Figure 3:
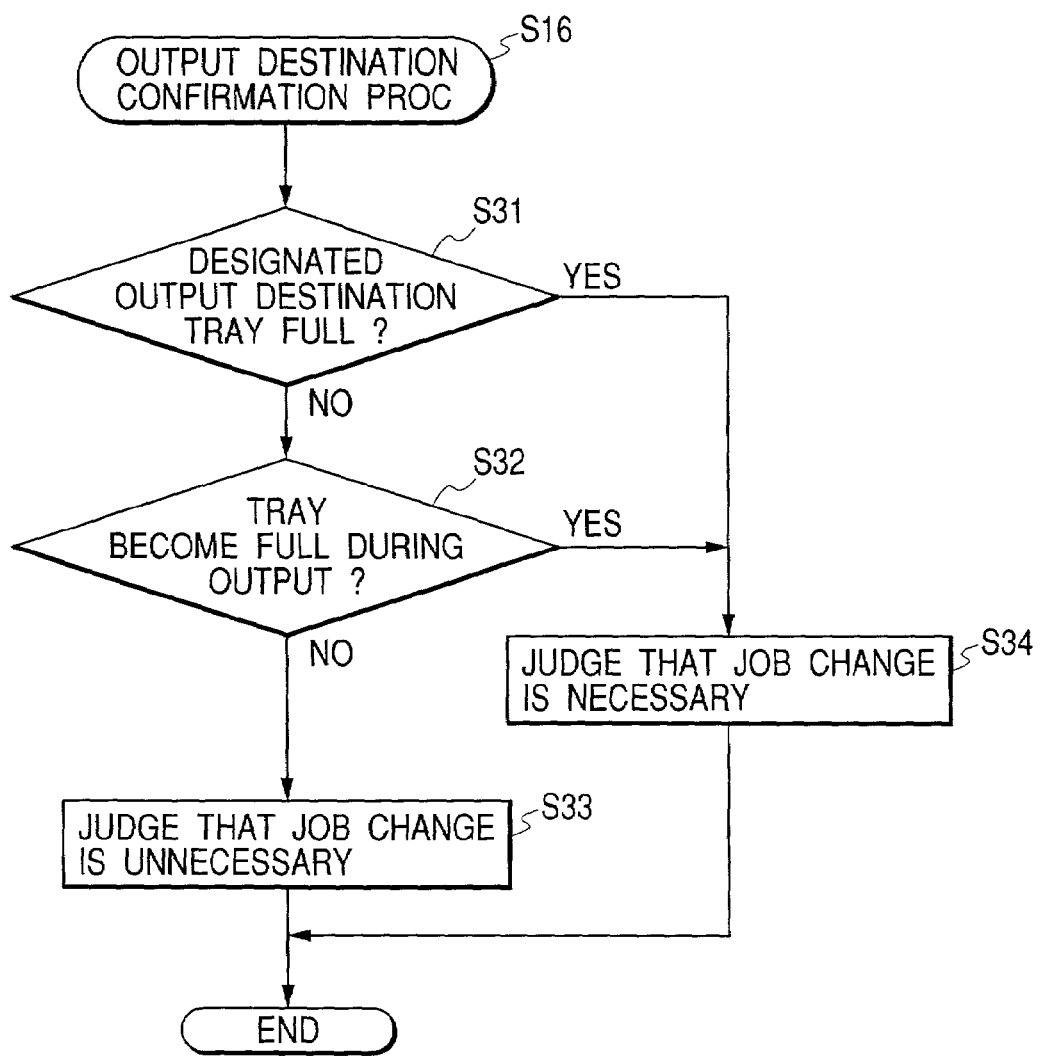
FIG. 3 is a flow chart showing an output destination tray confirmation process of the printer, shown in FIG. 2.

FIG. 3 is a flow chart showing the output destination tray confirmation process concerning the output process in the step S8 of FIG. 2.

In a step S31, it is judged whether or not the designated sheet discharge tray (one of the sheet discharge trays 5001 to 5003 of FIG. 8) is currently full of the stacked sheets. In this case, the full stack sensor 5010 of each of the trays 5001 to 5003 detects the full stack state. As to which of the sheet discharge trays the target job designates, the output destination 6004 in the job management table 6000 created based on the data set in the sheet output destination 4012 of the print job is checked.

If judged that the designated sheet discharge tray is full of the stacked sheets, the flow advances to a step S34.

In the step S34, it is judged that a print job change is necessary. Thus, the print job which is ready to be output and of which the output destination is designated to another sheet discharge tray is preferentially executed.

Conversely, if judged in the step S31 that the designated sheet discharge tray is not full of the stacked sheets, the flow advances to a step S32.

In the step S32, it is expected whether or not the sheet discharge tray becomes full of the stacked sheets during the output operation of the target print job. In this case, such the expectation can be performed by detecting the quantity of the stacked sheets by 10% with the stack quantity sensor 5020.

The number of outputs 6005 stored in the job management table 6000 is compared with an operation value (i.e., "the number of sheets capable of being maximumly stacked in the sheet discharge tray"—"the number of sheets currently stacked in the sheet discharge tray"). If the number of outputs 6005 is larger than the operation value, it is judged that the sheet discharge tray becomes full of the stacked sheets during the output operation of the target print job, and the flow advances to the step S34.

Conversely, if it is judged that the sheet discharge tray does not become full of the stacked sheets during the output operation of the target print job, the flow advances to a step S33.

In the step S33, it is judged that the print job change is unnecessary, and then the process ends.

Here, the flow chart of FIG. 2 will be explained again.

In a step S17, it is judged based on the result of the output destination tray confirmation process whether or not the print job change is necessary. If judged that the print job change is necessary, the flow advances to a step S18.

In the step S18, a process to change the order of printing of the print jobs is performed.

In the process to change the order of printing of the print jobs, the job management table 6000 is retrieved. Thus, after the target print job (including the print job of which the designated sheet discharge destination has been full of the stacked sheets, or the print job of which the designated sheet discharge destination is not yet full of the stacked sheets but is full of the stacked sheets before all the pages are output), if the print job of which the output destination is designated to another sheet discharge tray (i.e., the tray which is not full of the sheets) has been registered, or the print job of which the number of outputs does not reach the full state during the output even if the same sheet discharge tray is used has been registered, such the print job other than the target print job is preferentially executed and its output operation is performed.

In a step S19, it is judged whether or not the job end command 4010 is detected. If judged that the job end command 4010 is detected, the flow advances to a step S20.

In the step S20, a job end process is performed. The job end process is the process to recognize the print data up to the job end as one job.

Conversely, if judged in the step S19 that the detected command is not the job end command 4010 or the job start command 4001, the flow advances to a step S21.

In the step S21, the data of the print job is stored in the reception buffer 2002.

In a step S22, the input trigger is issued.

By issuing the input trigger, the main process of FIG. 1 passes through the trigger waiting loop of the step S3 and advances to the step S4.

(Output Process)

FIG. 4 is a flow chart showing the output process in FIG. 1.

In a step S41, it is judged whether or not the output trigger is issued. If the output trigger is issued in the step S8 of the main process (FIG. 1), the flow advances to a step S42.

In the step S42, the page data (the drawing object) in the page buffer 2004 is read.

In a step S43, a video output is performed to the printer engine (i.e., the print unit 17 of FIG. 10), whereby the printing is actually performed.

In a step S44, it is judged whether or not the page data to be output to the page buffer 2004 exists.

If judged that the page data exists, the flow returns to the step S42 to again read the page data. Conversely, if judged that the page data does not exist, the flow returns to the step S41 to wait for issue of the output trigger.

Next, the control which includes the processes shown in the flow charts of FIGS. 1 to 4 and is performed by the main processing unit 2000 will be explained with reference to concrete examples shown in FIGS. 11A, 11B, 12A and 12B.

First, the LBP 1000 of the present embodiment contains the sheet discharge unit which has the three sheet discharge trays A, B and C as the units to hold and store the sheets. Each tray has the sensor to check presence/absence of the sheet and the sensor to detect the quantity of the stacked sheets.

In this case, it is assumed that the number of sheets capable of being maximumly stacked in one sheet discharge tray is "100". Thus, the main processing unit 2000 handles one tray as a full-stacked state according as 100 sheets are stacked on this tray. Actually, when a height sensor detects that the height of the stacked sheets on one tray reaches the height of the stacked 100 sheets, the main processing unit 2000 confirms such a fact based on the detected result of the height sensor and thus handles this tray as the full-stacked state.

Based on the above, the state of the sheet discharge unit of the LBP 1000 will be described. In the example shown in FIG. 11A, 70 sheets to which the print job had been ended has been stacked on the tray A, whereby this tray A becomes full when other 30 sheets are stacked. The trays B and C are empty.

Then, it is assumed that the print job (hereinafter called a job 1) that the number of output sheets is "40" and the output destination is the tray A, the print job (hereinafter called a job 2) that the number of output sheets is "20" and the output destination is the tray A, the print job (hereinafter called a job 3) that the number of output sheets is "30" and the output destination is the tray B, and the print job (hereinafter called a job 4) that the number of output sheets is "50" and the output destination is the tray C are input from the host computer in due order.

In the ordinary process, since the print process is performed according to the order of printing of the input print jobs, it is scheduled to perform the printing in the order the jobs 1, 2, 3 and 4. Therefore, the printing of the job 1 is first started, and the print-processed sheets are sequentially discharged to the tray A. Then, at the time when the 30 sheets of the total 40 sheets are discharged, the tray A is full of the stacked sheets. Thus, at this time, the printing of the job 1 is stopped, and the printing is not restarted until the stacked sheets are removed from the tray A. Then, the jobs 2, 3 and 4 input subsequent to the job 1 are not output.

Although the jobs 2, 3 and 4 are the jobs which can be completely output without making the trays full due to their numbers of outputs and their output destinations, in the ordinary process the printing of these jobs can not be started due to the interruption of the print process of the job 1.

Thus, in the present embodiment, the job management table shown as an example 1 of FIG. 11B is created on the memory. When the job management table is created, the job ID's are allocated according to the order of printing of the input jobs, and the job names, the output destinations and the numbers of outputs are generated by using the data included in the commands of FIG. 7 received from the host computer. Before the printing is started, the number of sheets to be print-processed in the job is compared with the quantity of sheets capable of being output on the target tray, so as to judge whether or not the printing of the job can be performed to the end. As a result, the job capable of being output is first print-processed (i.e., the order of printing of the print jobs is changed).

As shown in the example 1 of FIG. 11B, since the output destination is the tray A and the number of output sheets is "40" in the job 1, the tray A becomes full of the stacked sheets while the print process of the job 1 is being performed. On the other hand, the output destination in the job 2 is the same as that in the job 1, i.e., the tray A, but the number of output sheets in the job 2 is "20". Thus, the tray A does not become full of the stacked sheets while the print process of the job 2 is being performed. Further, since the output destination in the job 3 is the tray B on which any discharged sheet is not yet stacked, the tray B does not become full of stacked sheets while the print process of the job 3 is being performed. Further, since the output destination in the job 4 is the tray C on which any discharged sheet is not yet stacked, the tray C does not become full of stacked sheets while the print process of the job 4 is being performed.

Thus, the main processing unit 2000 makes "NG" the output NG/OK setting of the print job (i.e., the job 1) that, even if the printing is started, such the printing can not be completely ended due to the full-stacked state (i.e., the state that the tray has become full of the stacked sheets or the state that the tray becomes full of the stacked sheets while the printing is being performed). Conversely, the main processing unit 2000 makes "OK" the output NG/OK setting of the print jobs (i.e., the jobs 2, 3 and 4) that, even if the printing is started, such the printing can be completely ended. Then, it is again scheduled to postpone the printing of the job of which the output NG/OK setting has been made "NG" and preferentially perform the printing of the job of which the output NG/OK setting has been made "OK".

Therefore, the order of printing of the print jobs which have been input in the order of the jobs 1, 2, 3 and 4 is changed such that the print jobs are executed in the order of the jobs 2, 3, 4 and 1, whereby the printing is actually performed in the changed order. Here, it should be noted that the order of printing of the print jobs of which the print outputs can be completely ended without making the trays full is based on the order in the input jobs (i.e., the order of the jobs 2, 3 and 4).

At this time, the printing of the job 1 is started after the printing of the jobs 2, 3 and 4 were performed. However, in this case, it is apparent that the sheets in the job 1 can not be output entirely to the tray A as long as the sheets already stacked on the tray A are not removed. Thus, before the printing of the job 1 is started, it may be controlled to display a message which urges an operator to remove the remaining sheets on the tray A on the display screen of the host computer at the data transmission origin of the job 1 and the operation panel of the LBP 1000, and thus hold the job 1 until it is confirmed based on the detected result from the sensor that the sheets on the tray A are removed. In such the control, in a case where a new job is input, if printing is possible to the newly input job (e.g., a job 5), the job 1 is skipped and the printing of the job 5 is performed.

Similarly, in such the state as shown in FIG. 11A, when the jobs 1, 2, 3 and 4 of which the contents are shown as an example 2 of FIG. 11B are input, it is scheduled to change the order of printing of the input jobs 1, 2, 3 and 4 to the order of printing of the jobs 3, 4, 1 and 2 on the basis of the contents of the job management table in the example 2 of FIG. 11B and the states of the sheets stacked in the sheet discharge unit. Then, the printing is actually performed in the order of the jobs 3 and 4. Next, the printing of the job 1 is performed, and such the printing is stopped when the output of the 30 sheets ends. On the other hand, after the printing was performed in the order of the jobs 3 and 4, it may be controlled to not start the printing of the jobs 1 and 2 but hold these jobs in the memory until the sheets stacked on the tray 1 are removed.

As described above, according to the present embodiment, in the state that the plural print jobs are being stored in the memory, if it is expected that the sheet discharge tray (the tray A in the example 1) corresponding to the output destination of the print job (the job 1 in the example 1) intended to be first print-processed is currently full of the stacked sheets or becomes full of the stacked sheets while the printing is being performed, the order of printing of the print jobs is changed, and the print process is performed in the changed order. In the example 1, the order of "job 1→job 2→job 3→job 4" is changed to the order of "job 2→job 3→job 4→job 1", and the printing is performed in the changed order. Thus, in the case where there are the plural print jobs, it is possible to prevent the inconvenient situation that, although the sheet discharge trays other than the sheet discharge tray used for the first print job are not yet full of the stacked sheets, when the first job stops because the sheet discharge tray used for the first print job becomes full of the stacked sheets, the other print jobs to be output to the sheet discharge trays other than the tray used for the first print job are also inoperable, whereby working efficiency can be improved.

In the above explanation using the example 1, if it is judged that the tray used in the job intended to be next print-processed is full of the sheets or becomes full of the sheets when the number of outputs in this job is added to the number of sheets already stacked in this tray, the output NG/OK setting is made "NG", while if it is judged that the tray used in the job intended to be next print-processed is not full of the sheets or does not become full of the sheets when the number of outputs in this job is added to the number of sheets already stacked in this tray, the output NG/OK setting is made "OK". However, it may be controlled to make the output NG/OK setting "NG" if the sheets already exist on the tray used in the job intended to be next print-processed, and make this setting "OK" if any sheet does not exist.

In this case, the output NG/OK setting of the job 2 described in the example 1 is made "NG" and thus the job 2 is postponed as well as the job 1, whereby the order of printing of the print jobs is changed to the order of the jobs 3, 4, 1 and 2. Thus, it is possible to prevent an inconvenience that one user takes other users' output matters because the outputs of the plural print jobs are mixedly stacked on one tray.

As described above, in the present embodiment, it is controlled to change the order of printing of the print jobs on the basis of the states of the sheets in the sheet holding unit (sheet presence/absence, full stack or not, a quantity of stacked sheets, etc.) and the information included in the print job to be output (e.g., the used sheet holding unit, the number of output sheets, etc.). Then, the print jobs are sequentially print-processed according to the changed order.

Further, it is possible to provide two modes, i.e., a mode to permit the change of the order of printing of the print jobs to be able to perform the above ordinary process, and a mode to not permit the change of the order of printing of the print jobs. In this case, a user may select either one of these two modes through the setting screen of the host computer or the operation unit of the LBP.

In the above explanation, as the sheet holding unit which holds and stores the sheets, the sheet discharge unit which holds and stores the sheets on which the images have been formed respectively was mainly controlled. However, the present embodiment is not limited to this. Namely, the present embodiment is applicable to a sheet feed unit which holds and stores sheets on which images are not yet formed. Hereinafter, this example will be explained with reference to FIGS. 12A and 12B.

In FIG. 12A, three sheets feed cassettes A, B and C are connected to the LBP 1000. The cassette A is used for A4-sized common sheet, and the 50 A4-sized common sheets are held in the cassette A. Similarly, the cassette B is used for A4-sized common sheet, but no sheet is held in the cassette B. The cassette C is used for A4-sized OHP sheet, but no sheet is held in the cassette C.

As described above, the size of the held sheet (i.e., a media size) and the type of the held sheet (i.e., a media type) can be set for each sheet feed unit. Such the size and the type are stored as the management information in the memory, whereby the main processing unit 2000 can appropriately read and confirm the management information from the memory. Each sheet feed unit has a sensor to detect presence/absence of the sheet and a sensor to detect a quantity of the remainder, and the main processing unit 2000 can capture information from these sensors. Thus, the main processing unit 2000 can confirm the sheet of what size and what type existing, and can confirm how the sheets remain, for each sheet feed unit.

Then, in the state shown in FIG. 12A, it is assumed that jobs 1, 2, 3 and 4 are input from the host computer to the LBP 1000 in due order. In the job 1, the output sheet size is set to be "A4", the type (media type) is set to be "OHP", and the number of output sheets is set to be "20". In the job 2, the output sheet size is set to be "A4", the type is set to be "common sheet", and the number of output sheets is set to be "80". In the job 3, the output sheet size is set to be "A3", the type is set to be "common sheet", and the number of output sheets is set to be "30". In the job 4, the output sheet size is set to be "A4", the type is set to be "common sheet", and the number of output sheets is set to be "40".

In this case, the job management table shown as an example 3 of FIG. 12B is created on the memory. When the job management table is created, the job ID's are allocated according to the order of printing of the input jobs, and the job names, the sheet sizes, the sheet types and the numbers of output sheets are generated by using the data included in the commands of FIG. 7 received from the host computer. Before the printing of the job is started, the information of the job stored in the memory such as the sheet size, the sheet type, the number of output sheets and the like and the information concerning the sheet feed unit included in the apparatus itself (i.e., the information including the detection result as to presence/absence of the sheet in the sheet feed unit and the detection result as to the quantity of the remaining sheets in the sheet feed unit, the information concerning the size and type of the sheet existing in the sheet feed unit, etc.) are confirmed, the sheet size, the sheet type and the number of printed sheets for each job are compared and checked, and then the sheet size, the sheet type and the quantity of the reminded sheets for each cassette are compared and checked. Thus, the job which satisfies all the conditions is preferentially print-processed.

In the example 3 of FIG. 12B, since there is no OHP sheet used for the job 1 in the cassette C, the condition for sheet type is set to be "NG" in the job 1. Although the sheet (common sheet) of which the size and type are suitable for the job 2 exists, the number of sheets necessary for the job 2 is not satisfied, whereby the condition for the number of prints is set to be "NG" in the job 2. Since there is no sheet of which the size is used for the job 2, the condition for sheet size is set to be "NG" in the job 3. Then, all the conditions for sheet size, sheet type and the number of prints are satisfied for the job 4, all the conditions are set to be "OK" in the job 4.

Therefore, since the print job which satisfies all the conditions is only the job 4, the printing of the job 4 is first performed. Namely, the order of printing of the print jobs which have been input in the order of the jobs 1, 2, 3 and 4 is changed such that the print jobs are executed in the order of the jobs 4, 1, 2 and 3.

After the printing of the job 4 ended, it is prepared to start the printing of the job 1. However, since the OHP sheet used in the job 1 does not exist in the sheet feed cassette, a message which notifies that there is no OHP sheet is displayed on the display screen of the host computer at the data transmission origin of the job 1 and the operation panel of the LBP 1000, and the printing is stopped. Then, a standby state is set and maintained to hold the jobs 1, 2 and 3 in the memory until the sheet (the OHP sheet in this case) is set in the cassette C by the operator. After then, according as it is confirmed from the detected result of the sensor of the cassette C that the OHP sheet is supplied and set to the cassette C, the printing is again performed from the job 1 in due order.

Since it is apparent that the printing of the jobs 1, 2 and 3 can not be completely performed, these jobs 1, 2 and 3 are held in the memory until the necessary conditions are satisfied. If a job which satisfies all the conditions exists in the jobs which are input after the jobs 1, 2 and 3 were input, it may be controlled to output such the job preferentially (i.e., a job overtaking operation) and postpone the jobs 1, 2 and 3 until these jobs satisfy all the conditions. Namely, each the jobs 1, 2 and 3 is always skipped until it satisfies the conditions, a printer interruption state does not occur.

Since the printing of the job 2 can be performed partway (i.e., up to first 10 sheets), the order of printing of the print jobs is changed to the order of the jobs 4, 2, 1 and 3. Then, it may be controlled to start the printing of the job 2 after the printing of the job 4 ended. At the time when the data of the job 2 corresponding to 10 sheets is printed, the above message notifying that there is no sheet is displayed on the display screen of the host computer at the data transmission origin of the job 2 and the operation panel of the LBP 1000, and the printing is stopped. Then, a standby state may be set and maintained to hold the jobs 2, 3 and 4 in the memory until the sheet (the common sheet in this case) is supplied and set in the cassette A or B by the operator.

[Other Embodiments]

The RAM is used as the storage means for storing the print jobs in the above embodiment, the present invention is not limited to this. Namely, a nonvolatile external memory can be used as such the storage means.

Further, each of the sheet discharge trays 5001 to 5003 is equipped with both the full stack sensor 5010 and the stack quantity sensor 5020 in the above embodiment. However, even in a case where each of the sheet discharge trays 5001 to 5003 is equipped with only the full stack sensor 5010 but not equipped with the stack quantity sensor 5020, the same processes as above can be performed.

Further, the printer is used as the output apparatus in the above embodiment, the present invention is not limited to this. Namely, the present invention is applicable to other various output apparatuses. Further, the printer is not limited to the LBP, whereby an inkjet printer and a printer of other print system may be used.

The present invention may be applied to a system composed of plural apparatuses (e.g., a host computer, an interface device, a reader, and a printer), or to a single-body apparatus (e.g., a small-sized image processor such as a PDA (personal digital assistants), a copier, or a facsimile machine).

It is needless to say that the present invention is applicable to a case where the functions of the above embodiments are achieved by supplying program codes of software to a system or an apparatus. Thus, a storage medium storing the program codes of software to achieve the functions of the above embodiments is supplied to the system or the apparatus and then a computer (or CPU or MPU) of the system or the apparatus reads and executes these program codes, whereby the above effects of the present invention can be obtained.

In this case, the program codes themselves achieve the functions of the above embodiments. Thus, the storage medium storing these program codes constitutes the present invention.

As the storage medium storing these program codes, e.g., a floppy disk, a hard disk, an optical disk, a magnetooptical disk, a CD-ROM, a CD-R, a magnetic tape, a nonvolatile memory card (i.e., an IC memory card), a ROM (e.g., a mask ROM, and a flash EEPROM (electrically erasable ROM)), or the like can be used.

Further, it is needless to say that the present invention includes not only the case where the functions of the above embodiments are achieved by the program codes read and executed by the computer, but also a case where an OS (operating system) or the like running on the computer executes a part or all of the actual processes based on instructions of the program codes and thus the functions of the above embodiments are achieved by such the processes.

Further, it is needless to say that the present invention includes a case where the program codes read from the storage medium are once stored in a memory provided in a function expansion board inserted in the computer or a function expansion unit connected to the computer, and then a CPU or the like provided in the function expansion board or the function expansion unit performs a part or all of the actual processes based on instructions of the program codes, whereby the functions of the above embodiments are achieved by such the processes.

While the present invention has been described with reference to the above embodiments, the present invention is not limited to the above embodiments but encompasses any and all modifications or combinations within the spirit and scope of the present invention.

What is claimed is:

1. A print apparatus comprising:
 a memory unit adapted to store a plurality of job data that includes at least first job data which is input before second job data;
 a print unit adapted to perform a printing of job data of said memory unit, by using a sheet storage unit which can store sheets; and
 a controller adapted to cause said print apparatus to perform one of a first operation and a second operation, wherein the first operation printing of said second job data is performed after a printing of said first job data is performed, and wherein the second operation printing of said second job data is performed before said printing of said first job data is started, based on at least an information related to a sheet type distinguished from a sheet size for said first job data,
 wherein said controller causes said print apparatus to perform said first operation when a sheet of said sheet type and said sheet size needed to said printing of said first job data is stored at least in said sheet storage unit, and causes said print apparatus to perform said second operation, even if a sheet of said sheet size needed to said printing of said first job data is stored in said sheet storage unit, when a sheet of said sheet type needed to said printing of said first job data is not stored at least in said sheet storage unit.

2. An apparatus according to claim 1, wherein
 said print apparatus has a plurality of sheet feeder units adapted to store sheets where print has not been done, as a plurality of sheet storage units,
 said print unit performs said printing of job data of said memory unit, by using sheets of at least one of said plurality of sheet feeder units, and
 said controller causes said print apparatus to perform one of said first operation and said second operation, based on an information related to sheet needed to said printing of said first job data and an information related to sheet needed to said printing of said second job data and an information related to sheet size of sheets is stored in said sheet feeder units and an information related to sheet type of sheets is stored in said sheet feeder units.

3. An apparatus according to claim 1, wherein said controller causes said print apparatus to perform said second operation, if a sheet of said sheet type and said sheet size needed to said printing of said second job data is stored at least in said sheet storage unit, in a case where a sheet of said sheet type needed to said printing of said first job data is not stored at least in said sheet storage unit.

4. An apparatus according to claim 1, wherein said first operation is an operation in which said printing of said second job data is stated after said printing of said first job data is completed, wherein said second operation is an operation in which said printing of said second job data is completed before said printing of said first job data is started.

5. An apparatus according to claim 1, wherein said first job data and said second job data are job data of the same attribute.

6. An apparatus according to claim 5, wherein said print apparatus has at least print function adapted to perform a printing of a job data from an external apparatus which includes at least a host computer,
wherein both said first job data and said second job data are job data of said print function.

7. An apparatus according to claim 1, wherein
said print apparatus has a sheet feeder unit adapted to store sheets where print has not been done, as said sheet storage unit,
said print apparatus has a sheet stacking unit adapted to store sheets where print has been done, as said sheet storage unit,
said print unit performs said printing of job data of said memory unit, by using sheets of said sheet feeder units,
said print apparatus discharges a sheet from said print unit to said sheet stacking unit,
said controller performs a first control adapted to execute one of said first operation and said second operation, based on, at least, an information related to sheet needed to said printing of said first job data and an information related to sheet type of sheet is stored in said sheet feeder unit, and
said controller performs a second control adapted to execute one of said first operation and said second operation based on at least a sheet stacking condition of said sheet stacking unit.

8. An apparatus according to claim 7, wherein
said controller causes said print apparatus to perform said first operation when a sheet of said sheet type and said sheet size needed to said printing of said first job data is stored at least in said sheet feeder unit, and causes said print apparatus to perform said second operation even if a sheet of said sheet size needed to said printing of said first job data is stored in said sheet feeder unit when a sheet of said sheet type needed to said printing of said first job data is not stored at least in said sheet feeder unit, as said first control, and
said controller causes said print apparatus to perform said first operation when said sheet stacking unit can stack sheets of said first job data, and causes said print apparatus to perform said second operation when said sheet stacking unit can not stack sheets of said first job data, as said second control.

9. An apparatus according to claim 1, wherein
the job data by which the printing of all the pages to be printed can be completed corresponds to said second job data, and
the job data by which the printing is stopped on the way does not correspond to said second job data.

10. An apparatus according to claim 1, wherein
said second job data is the job data by which the printing is not interrupted during the period from the start of the printing to the completion of the printing, and
in a case where other plural job data including said second job data by which the printing is not interrupted exist in said memory unit, when said second operation is performed, said controller causes said print apparatus to be able to wholly complete the printing of said other plural job data before starting the printing of said first job data.

11. An apparatus according to claim 1, wherein
said first job data is the job data by which the printing is interrupted during the period from the start of the printing to the completion of the printing, and
said second job data is the job data by which the printing is not interrupted during the period from the start of the printing to the completion of the printing.

12. An apparatus according to claim 1, wherein, in the case where said first operation is performed, when a print interruption factor occurs after the printing of said first job data was started, said controller stops the printing of said first job data and causes said memory unit to hold said first job data and said second job data as a print standby state.

13. An apparatus according to claim 1, wherein, in the case where said first operation is performed, when a print interruption factor occurs after the printing of said first job data was started, said controller stops the printing of said first job data and notifies error information.

14. An apparatus according to claim 1, wherein, in the case where said first operation is performed, when a print interruption factor occurs after the printing of said first job data was started, said controller stops the printing of said first job data and restarts the printing of said first job data after said print interruption factor is eliminated.

15. An apparatus according to claim 1, wherein, in the case where said second operation is performed,
said controller starts the printing of said first job data after the printing of said second job data was completed, and
when a print interruption factor occurs after the printing of said first job data was started, said controller stops the printing of said first job data.

16. An apparatus according to claim 1, wherein, in the case where said second operation is performed, said controller does not start the printing of said first job data until the sheet of the sheet size and the sheet type needed to the printing of said first job data is set on said sheet storage unit.

17. An apparatus according to claim 1, wherein said controller enables to determine whether or not to perform said second operation, based on an instruction of a user input through at least either a user interface unit of an external apparatus or a user interface unit of said print apparatus.

18. An apparatus according to claim 1, wherein, even when the sheet of the sheet size and the sheet type needed to the printing of said first job data is set on said sheet storage unit, said controller causes said print apparatus to perform said second operation in a case where the plural sheets the number of which is needed to the printing of said first job data are not stored in said sheet storage unit.

19. An apparatus according to claim 1, wherein said print apparatus is the apparatus which is applied to a system composed of a host computer and plural units including at least any one of an interface unit, a reader unit and a print unit.

20. An apparatus according to claim 1, wherein said print apparatus is the apparatus which is applied to an apparatus consisting of only one equipment being at least one of a copier and a fax machine.

21. A method adapted to a print apparatus which can perform a printing process of job data of a memory unit which can store a plurality of job data that includes at least first job data which is input before second job data by using a sheet storage unit which can store sheets, said method comprising:
  causing said print apparatus to perform a first operation in which a printing of said second job data is performed after a printing of said first job data is performed when a sheet of a sheet size and a sheet type distinguished from said sheet size needed to said printing of said first job data is stored at least in said sheet storage unit; and
  causing said print apparatus to perform a second operation in which said printing of said second job data is performed before said printing of said first job data is started, even if a sheet of said sheet size needed to said printing of said first job data is stored in said sheet storage unit, when a sheet of said sheet type needed to said printing of said first job data is not stored at least in said sheet storage unit.

22. A method according to claim 21, wherein said print apparatus has a plurality of sheet feeder units adapted to store sheets where print has not been done, as a plurality of sheet storage units, wherein said print apparatus performs said printing of job data of said memory unit, by using sheets of at least one of said plurality of sheet feeder units, said method wherein,
  causing said print apparatus to perform one of said first operation and said second operation, based on an information related to sheet needed to said printing of said first job data and an information related to sheet needed to said printing of said second job data and an information related to sheet size of sheets is stored in said sheet feeder units and an information related to sheet type of sheets is stored in said sheet feeder units.

23. A method according to claim 21, said method wherein,
  causing said print apparatus to perform said second operation, if a sheet of said sheet type and said sheet size needed to said printing of said second job data is stored at least in said sheet storage unit, in a case where a sheet of said sheet type needed to said printing of said first job data is not stored at least in said sheet storage unit.

24. A method according to claim 21, said method wherein,
  said first operation is an operation in which said printing of said second job data is stated after said printing of said first job data is completed, wherein said second operation is an operation in which said printing of said second job data is completed before said printing of said first job data is started.

25. A method according to claim 21, wherein said first job data and said second job data are job data of the same attribute.

26. A method according to claim 25, wherein
  said print apparatus has at least print function adapted to perform a printing of a job data from an external apparatus which includes at least a host computer, and both said first job data and said second job data are job data of said print function.

27. A method according to claim 21, wherein said print apparatus has a sheet feeder unit adapted to store sheets where print has not been done, as said sheet storage unit,
  wherein said print apparatus has a sheet stacking unit adapted to store sheets where print has been done, as said sheet storage unit,
  wherein said print apparatus performs said printing of job data of said memory unit, by using sheets of said sheet feeder units, and
  wherein said print apparatus discharges a sheet from said print unit to said sheet stacking unit: and
  wherein said method,
  performing a first control adapted to execute one of said first operation and said second operation, based on, at least, an information related to sheet needed to said printing of said first job data and an information related to sheet type of sheet is stored in said sheet feeder unit; and
  performing a second control adapted to execute one of said first operation and said second operation based on at least a sheet stacking condition of said sheet stacking unit.

28. A method according to claim 27, wherein said method,
  causing said print apparatus to perform said first operation when a sheet of said sheet type and said sheet size needed to said printing of said first job data is stored at least in said sheet feeder unit, and causing said print apparatus to perform said second operation even if a sheet of said sheet size needed to said printing of said first job data is stored in said sheet feeder unit when a sheet of said sheet type needed to said printing of said first job data is not stored at least in said sheet feeder unit, as said first control; and
  causing said print apparatus to perform said first operation when said sheet stacking unit can stack sheets of said first job data, and causing said print apparatus to perform said second operation when said sheet stacking unit can not stack sheets of said first job data, as said second control.

29. A method according to claim 21, wherein
  the job data by which the printing of all the pages to be printed can be completed corresponds to said second job data, and
  the job data by which the printing is stopped on the way does not correspond to said second job data.

30. A method according to claim 21, wherein
  said second job data is the job data by which the printing is not interrupted during the period from the start of the printing to the completion of the printing, and
  in a case where other plural job data including said second job data by which the printing is not interrupted exist in said memory unit, when said second operation is performed, said controller causes said print apparatus to be able to wholly complete the printing of said other plural job data before starting the printing of said first job data.

31. A method according to claim 21, wherein
  said first job data is the job data by which the printing is interrupted during the period from the start of the printing to the completion of the printing, and
  said second job data is the job data by which the printing is not interrupted during the period from the start of the printing to the completion of the printing.

32. A method according to claim 21, wherein, in the case where said first operation is performed, when a print interruption factor occurs after the printing of said first job data was started, said controller stops the printing of said first job data and causes said memory unit to hold said first job data and said second job data as a print standby state.

33. A method according to claim 21, wherein, in the case where said first operation is performed, when a print interruption factor occurs after the printing of said first job data was started, said controller stops the printing of said first job data and notifies error information.

34. A method according to claim 21, wherein, in the case where said first operation is performed, when a print interruption factor occurs after the printing of said first job data was started, said controller stops the printing of said first job data and restarts the printing of said first job data after said print interruption factor is eliminated.

35. A method according to claim 21, wherein, in the case where said second operation is performed,
causing to start the printing of said first job data after the printing of said second job data was completed, and
when a print interruption factor occurs after the printing of said first job data was started, causing to stop the printing of said first job data.

36. A method according to claim 21, wherein, in the case where said second operation is performed, causing not start the printing of said first job data until the sheet of the sheet size and the sheet type needed to the printing of said first job data is set on said sheet storage unit.

37. A method according to claim 21, wherein said method enables to determine whether or not to perform said second operation, based on an instruction of a user input through at least either a user interface unit of an external apparatus or a user interface unit of said print apparatus.

38. A method according to claim 21, wherein, even when the sheet of the sheet size and the sheet type needed to the printing of said first job data is set on said sheet storage unit, causing said print apparatus to perform said second operation in a case where the plural sheets the number of which is needed to the printing of said first job data are not stored in said sheet storage unit.

39. A method according to claim 21, wherein said print apparatus is the apparatus which is applied to a system composed of a host computer and plural units including at least any one of an interface unit, a reader unit and a print unit.

40. A method according to claim 21, wherein said print apparatus is the apparatus which is applied to an apparatus consisting of only one equipment being at least one of a copier and a fax machine.

41. A method according to claim 21, wherein
said print apparatus can print the job data output from an external apparatus at least including a host computer, and
in said method, enabling to select either said first operation or said second operation to be executed by said print apparatus, through a user interface unit of said external apparatus.

42. A method according to claim 21, wherein
in said method, enabling to select either said first operation or said second operation to be executed by said print apparatus, through an operation unit of said print apparatus.

43. A method according to claim 21, wherein
in said method, causing a user to be able to select either a mode of permitting to perform said second operation or a mode of inhibiting from performing said second operation, through a user interface unit of at least either said print apparatus or an external apparatus.

44. A computer-readable storage medium for storing a computer-executable program for implementing a method adapted to a print apparatus which can perform a printing process of job data of a memory unit which can store a plurality of job data that includes at least first job data which is input before second job data by using a sheet storage unit which can store sheets, the method comprising:
causing said print apparatus to perform a first operation in which a printing of said second job data is performed after a printing of said first job data is performed when a sheet of a sheet size and a sheet type distinguished from said sheet size needed to said printing of said first job data is stored at least in said sheet storage unit; and
causing said print apparatus to perform a second operation in which said printing of said second job data is performed before said printing of said first job data is started, even if a sheet of said sheet size needed to said printing of said first job data is stored in said sheet storage unit, when a sheet of said sheet type needed to said printing of said first job data is not stored at least in said sheet storage unit.

* * * * *

UNITED STATES PATENT AND TRADEMARK OFFICE
CERTIFICATE OF CORRECTION

PATENT NO. : 6,985,247 B2
APPLICATION NO. : 09/877193
DATED : January 10, 2006
INVENTOR(S) : Takeshi Utsunomiya It is certified that error appears in the above-identified patent and that said Letters Patent is hereby corrected as shown below:

COLUMN 2
    Line 55, "exposure" should read --expose--.

COLUMN 4
    Line 57, "ore" should read --or--.

COLUMN 6
    Line 62, "an" should read --a--.

COLUMN 9
    Line 3, "other" should read --another--.

COLUMN 12
    Line 2, "existing," should read --exists,--.

COLUMN 13
    Line 11, "each" should read --each of--.

COLUMN 15
    Line 13, "stated" should read --started--.

COLUMN 17
    Line 53, "stated" should read --started--.

COLUMN 19
    Line 22, "causing not start" should read --not causing the start of--.

Signed and Sealed this

Fifteenth Day of August, 2006

JON W. DUDAS
*Director of the United States Patent and Trademark Office*